BASIC INTERFEROMETER TRACKING SYSTEM

3,378,837
PRECISION TRACKING SYSTEM

Ross E. Graves, Pacific Palisades, Los Angeles, Calif., assignor to TRW Inc., a corporation of Ohio
Filed Oct. 14, 1963, Ser. No. 315,748
6 Claims. (Cl. 343—7.5)

This invention relates to a satellite synchronized precision timing system having an accuracy of the order of a nanosecond ($10^{-9}$) for use in a tracking and guidance system capable of tracking space vehicles from a plurality of remote world-wide tracking stations.

In this invention a relay satellite having a two-way transmission capability is used to establish communication between a master station and a number of slave stations. The timing system employs the two-way transmission from the master station to the relay satellite to the slave station and back to the relay satellite to the master station in order to eliminate uncertainties in transit between the master station and the slave station and to thereby correct the time received by the slave station for the transit time delay. While timing accuracies of the order achievable by this technique are not required for most timing applications, it is now feasible to implement very long baseline radio interferometers for tracking (and guidance) of space vehicles with accuracies heretofore unobtainable. Well known techniques may be used for coding the timing signals; and stable oscillators, such as automatically stabilized oscillators, may be employed as "flywheels" at the slave stations to permit time-sharing a relay satellite among a number of ground stations.

Timing accuracies of the order mentioned above are needed in connection with precision continuous wave (CW) guidance and tracking systems of the type described and claimed in copending applications entitled, Phase-Stable Receiver, Ser. No. 237,229, filed Nov. 13, 1962, and Beacon Tracking Radar, Ser. No. 248,357, filed Dec. 31, 1962, both assigned to the same common assignee, now U.S. Patents Nos. 3,308,380 and 3,290,677, respectively.

In the basic interferometer tracking system a ground based radar illuminates the space vehicle with a CW signal which is phase coherently retransmitted to a plurality of remote receiver tracking stations. These receivers typically are required to operate over a dynamic range of 80 db or more while tracking a vehicle traveling at a velocity up to 40,000 ft./sec. with an acceleration as high as 1,000 ft./sec.$^2$. The receivers must generally operate down to signal levels of −140 dbm, or smaller, while tracking a vehicle with the aforementioned characteristics. With guidance and tracking systems of the sort contemplated, position and rate measurements are made by employing system baselines whose lengths may range from one hundred miles to over five thousand miles. Rate measurements are preferably made by direct use of carrier Doppler data, while range measurements are made by measuring the time differences between the transmitted and received signal.

In the basic interferometer system the CW radar signal from the master station illuminates the coherent transponder carried by the space vehicle being tracked. The coherent transponder on the space vehicle retransmits a signal to all the ground based receivers that is coherent with the CW radar signal received by the transponder. The ground station is also adapted to transmit a timing synchronizing (SYNC) signal to all the receiver stations for synchronizing the slave clocks with the master clock with respect to time and frequency. The data output from each of the receiver stations, together with frequency and timing (phase) information, is ultimately fed to data processors consisting of analog and digital data extraction equipment and of computers and associated equipment, which are responsive to the output of the receivers for determining range and bearing information of the moving space vehicle. The receivers may be identical and are arranged to compare the phase of the coherent signal received from the space vehicle with the SYNC signal received directly from the transmitter. The phase change in each of the receivers is an indication of the relative movement of the moving space vehicle. The three receivers in this configuration are known as an interferometer and by themselves will produce sufficient information to determine pairs of range differences. In the case where the distance to the space vehicle is large relative to the separations (baselines) between the receivers, these range differences are substantially equivalent to angular position (bearing) information. The combination of the transmitter and receiver at the master station will produce ranging information which, together with the range difference information from the three receivers connected as an interferometer, will produce range and bearing information sufficient to track an object in space.

The problem associated with a long baseline interferometer of the order of hundreds or even thousands of nautical miles is synchronized. The system is completely flexible in that a relay satellite preferably maintained in a 24 hour orbit, but not limited thereto, and having a two-way transmission CW transponder or a pair of transponders is used on a time sharing basis to synchronize a plurality of remote receiver stations (slave stations) within the field of coverage of the relay satellite. In other words the relay satellites are employed for time (or equivalently phase) synchronization of a plurality of ground stations efficiently and economically. The major problem in employing relay satellites for time synchronization is compensation for the transit time of the signal from the master station to each of the slave stations, which is many orders of magnitude greater than the maximum permissible timing errors. For this reason, the proposed synchronizing system employs two-way transmission between the master station and each of the slave stations. Normally, the phase (or time) of the signal transmitted from the master station would be advanced by precisely the amount required to compensate for one-half of the total round trip transit time delay, with appropriate provision for compensation of equipment time delays also. With this mode of operation, only a single slave station is synchronized at any one time with a single pair of channels in the relay satellite. Having determined the transit delay is equivalent to knowing the time of the slave station relative to the master station. This information may be alternatively used in data reduction instead of physically changing the time of the slave station. The claimed timing accuracies are achieved by using suitable flywheel oscillators at each of the ground stations in order to maintain the necessary time (or phase) synchronization during the period when the synchronization link is not operating between the master station and the slave station, but is being used to synchronize other slave stations. A typical flywheel oscillator would be a state-of-the-art automatically stabilized oscillator. A suitable oscillator would be a rubidium frequency standard (RFS) presently being offered for sale. With the performance achievable with such oscillators it is possible to maintain synchronization of a very large number of ground stations to within a nanosecond by time sharing a single timing relay satellite. It is recognized, of course, that a single satellite cannot provide world wide coverage and that a primary master station may be used to synchronize a number of secondary master stations located around the world by means of additional relay satellites in suitable orbits which in turn will serve as masters for synchronizing a large number of ground stations located around the globe. In either case, the principles of this invention for recognizing and eliminating the effect of transit time in synchronizing the stations will be the same.

Further objects and advantages of this invention will be made more apparent by referring now to the accompanying drawings wherein.

Figure 1:
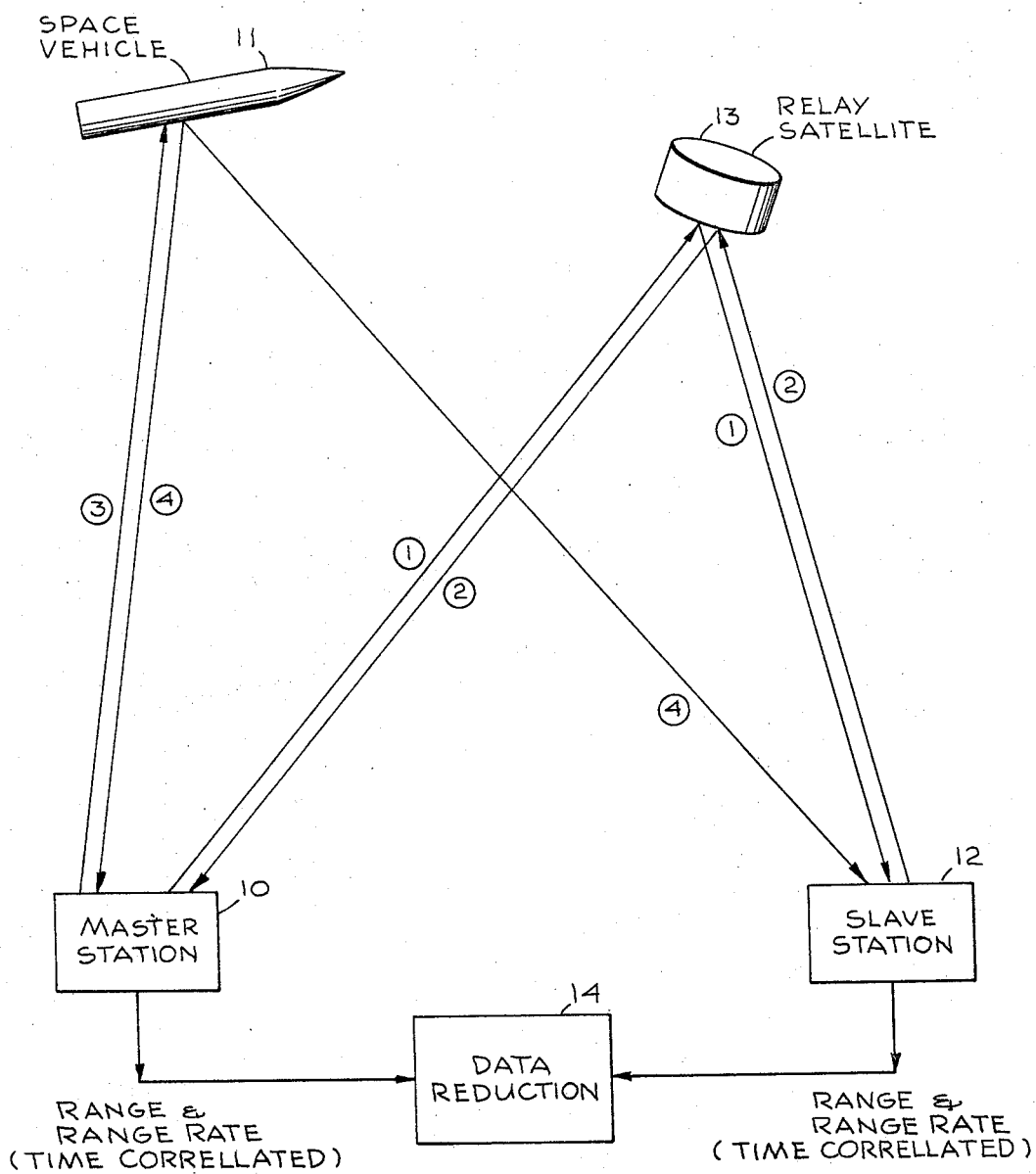
FIG. 1 is a block diagram of the space vehicle tracking system and time synchronizing system.

Referring now to FIG. 1, there is shown a block diagram of a CW two-way Doppler interferometer system using a relay satellite for synchronizing remote world wide receiving stations. A CW transmitter located at a master station 10 illuminates a space vehicle 11 being tracked with a signal 3. Located on the space vehicle 11 is a phase coherent transponder that transmits a signal 4 that is phase coherent with the received signal 3 back to a plurality of receiving stations 12 (slave stations) comprising the interferometer system. The master station 10 also receives a signal 4 from the space vehicle 11 and is part of the interferometer system. The range rate ($\dot{R}$) of moving space vehicle 11 is tracked at the master station 10 by comparing the frequency of the transmitted signal 3 with the frequency of the received signal 4 from the space vehicle 11, since the frequency of the received signal 4 bears a definite known relationship to the frequency of the transmitted signal 3, except for the Doppler shift. The range (R) of the space vehicle 11 is determined at station 10 by comparing the time of the transmitted signal 3 with the time of the received signal 4 in order to establish the time difference which is a measure of the round trip range (R) from the master station 10 to the space vehicle 11 and return. When the clock of the slave station 12 is properly synchronized in frequency with the clock at the master station 10, it becomes possible for the slave station 12 to measure the range rate sum as measured from the master station 10 to the space vehicle 11 to the slave station 12. With the slave clock synchronized in time and frequency, the slave station 12 can measure the time difference between the signal transmitted from the master station 10 and received at the slave station, and hence determine the range (R) sum as measured from the master station, to the space vehicle to the slave station.

Synchronizing the clock of the slave station with the master clock with respect to time and frequency is accomplished by first determining the transit time delay. A timing signal 1 from the master station 10 is transmitted to a relay satellite 13 having a suitable transponder for retransmitting the signal 1 from the satellite 13 to the slave station 12 being synchronized with the master station. The timing signal 2 is retransmitted back to another transponder on the satellite 13 which retransmits the timing signal 2 to the master station 10. The time difference between the transmitted and received timing signal is a measure of the total transit time. The one-way transit time delay from master station 10 to relay satellite 13 to the slave station 12 is then one half the measured total transit time. The coded time signal from the master station is advanced in time an amount equal to the one-way transit time delay and transmitted via the satellite 13 to the slave station 12. In this manner the slave clock at the slave station 12 is automatically adjusted by comparing the slave clock time with that received from the master station 10. With the slave station time synchronized with that of the master station 10 it is possible to determine the range sum and range rate sum as previously described at the slave station. Repeating this process at a plurality of slave stations allows the position of the space vehicle 11 to be determined with the accuracy claimed, at a suitable data reduction center 14.

Selection of useful orbits and satellite placement within these orbits is complicated by the very large number of possible alternatives. A particularly attractive choice is a number of satellites in synchronous (24-hour) equatorial orbits. Three such satellites, equally placed, would provide line-of-sight coverage to a substantial portion of the world. The proper selection of altitude and orbit is necessary since for a satellite in a low or middle altitude orbit it would be necessary to correct for changes in propagation path lengths in the transit time correction. For example, an uncertainty in path length of 10 feet would introduce a timing uncertainty of 10 nanoseconds. The relatively large range-rates (with respect to the earth) of low and medium altitude satellites may introduce an uncertainty in excess of 10 feet; however, propagation path length uncertainties are reduced and may be corrected for as more accurate orbital data is available.

As mentioned previously, to synchronize the system clocks to the desired accuracy, it would be necessary to calibrate each clock in the system (with respect to the master standard) possibly every hour, or even more frequently depending on the clock stabilities and accuracies desired. It is clearly an advantage to have a relay satellite in "view" every instant of the day (as would be the case for the synchronous satellite) since use of the satellite transponder will be time-shared with numerous ground stations. Considering the great expense of a satellite system it is expected that the two transponders needed for the time synchronization system would be incorporated as a secondary function on a communication satellite system (such as Syncom).

The time coded signals are expected to be in the form of a sequence of sinusoidal subcarriers. By using sinusoidal subcarriers bandwidth problems associated with pulse coding techniques are eliminated. In one embodiment the ground station would produce a reference carrier plus sideband pairs obtained by phase modulation of the carrier frequency with several harmonically related sidetones. The subcarriers, and if desired the carrier frequency, may be synthesized from the master frequency standard. Alternatively, ambiguity resolution could be achieved by swept carrier techniques. Several advantages of using sinusoidal subcarriers for phase coding of the timing signals are: (1) the removal of transit time could be implemented very simply by phase shifters prior to transmission of the timing signals, (2) precision phase measurements to obtain desired timing accuracy can be made using a phase comparison technique, (3) small information bandwidth required, and (4) stabilization of the time delays in the transmitting and receiving equipment to a few nanoseconds at most may be achieved by using modulation feedback or other circuit techniques.

Figure 2:
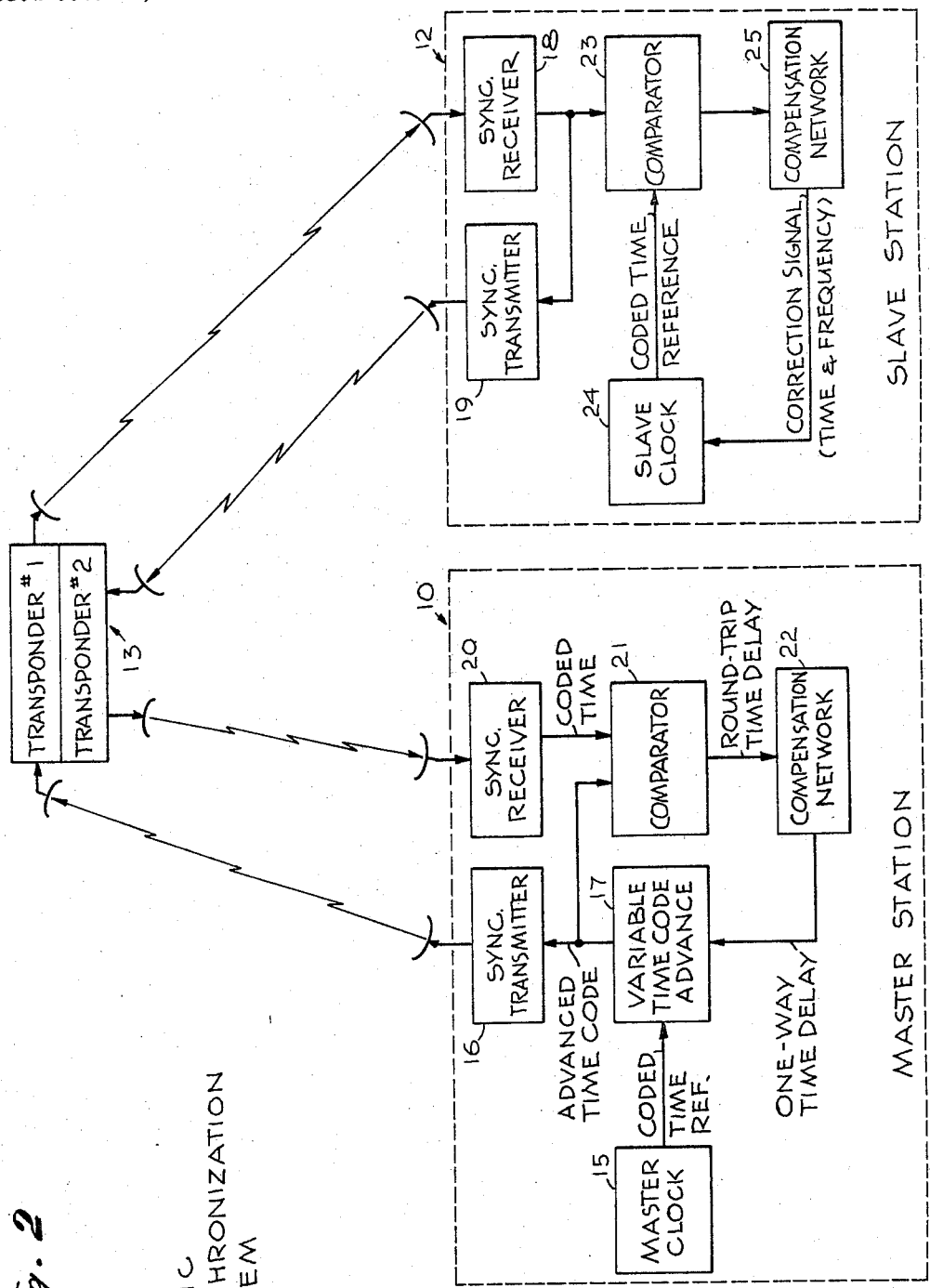
FIG. 2 is a more complete block diagram of the basic synchronizing system.

Referring now to FIG. 2 there is shown a block diagram of the synchronizing system using the relay satellite, which together with the interferometer system form a complete world-wide tracking and guidance system. As mentioned previously, the timing or synchronizing system employs two transponders in the satellite 13 for establishing two-way communication between pairs of ground stations such as the master station 10 and the slave station 12. The time base for the system is a master clock 15, preferably a high precision frequency standard such as an atomically stabilized oscillator.

The master clock 15 generates coded time reference signals that are fed to a SYNC transmitter 16 through a variable time code advance 17. The purpose of the variable time code advance 17 is to advance the coded time reference in time a given amount, depending on the measured transit time delay. The coded signal transmitted from the SYNC transmitter 16 is received by a first transponder located in the relay satellite 13 which retransmits the timing signal to a SYNC receiver 18 located in the slave station 12. The received coded timing signal is retransmitted by a SYNC transmitter 19 back to a second transponder located in the relay satellite 13 which retransmits the coded timing signal to a SYNC receiver 20 located at the master station. The coded time signal from the SYNC receiver 20 is fed to a comparator 21 which also receives an output from the variable time advance 17 representing the coded timing signal originally transmitted. The output of the comparator 21 will therefore represent the time difference between the coded time signal transmitted to the slave station via the first transponder in the satellite 11 and that received from the slave station via the second transponder in the satellite 11. Expressed in another way, the output of the comparator 21, corrected for fixed circuit delays, will represent the round trip total transit time. The output of the comparator 21 feeds a compensation network 22 arranged to generate an output signal equivalent to one half the total transit time delay and also compensate for other fixed time delays. The output of the compensation network 22 controls the variable code advance 17 in such a manner as to advance the transmitted code time reference signal transmitted by the SYNC transmitter 16 by an amount equal to the measured one-way transit time delay suitably corrected for fixed circuit delays (phase shifts). Having established the one-way transit time delay and having advanced the coded time signal transmitted by the SYNC transmitter 16, it can be appreciated that the advanced coded time signal when received at the slave station 12 will be in-time with the master station 10. The advance time coded signal having been properly coded so as to indicate to the SYNC receiver 18 that the coded time has been compensated for the one-way transit time delay is received by the receiver 18 and fed to a comparator 23. The slave station 12 also contains a slave clock 24 preferably having the same characteristics as the master clock 15 and arranged to generate coded time reference signals which are also fed to the comparator 23. The comparator 23 compares the coded time signals generated by the slave clock 24 with the adjusted coded time signals received from the SYNC receiver 18 and in response thereto controls a compensation network 25. The output of the compensation network 25 is a correction signal responsive to both the time and frequency difference between the slave clock 24 and the received coded signal from the SYNC receiver 18 for correcting the coded time signal and the frequency generated by the slave clock 24.

Figure 3:
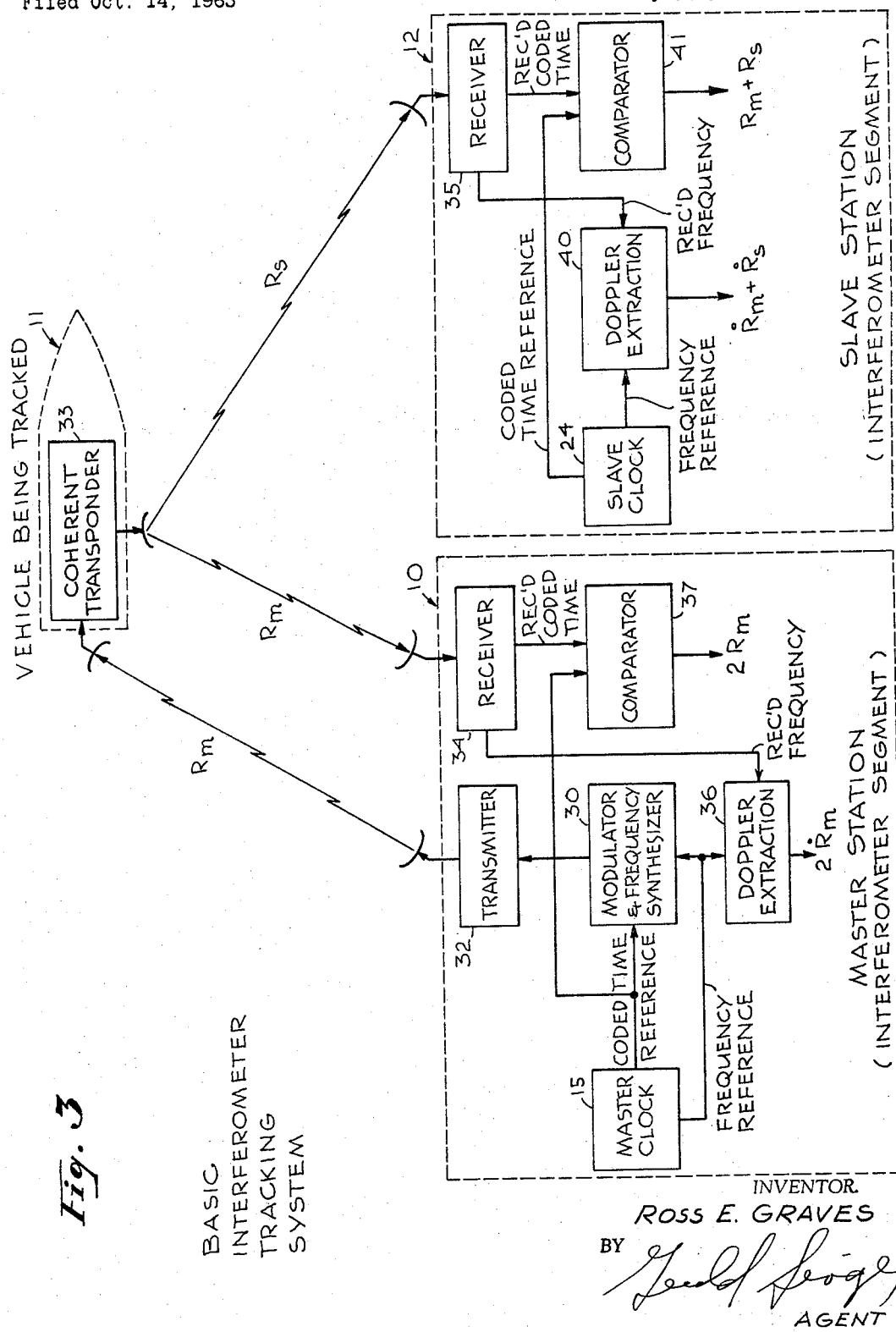
FIG. 3 is a more complete block diagram of the basic interferometer tracking system.

Referring now to FIG. 3, there is shown a block diagram of the interferometer tracking system. The interferometer portion of the master station 10 preferably comprises a CW transmitter comprising a modulator and frequency synthesizer 30 controlled by the master clock 15 arranged to generate coded time reference signals. The time signals used in the interferometer system would normally be coded in the form of sinusoidal subcarriers as described in connection with the time synchronizing system. The master clock 15 is also used as a basis for generating a frequency reference which is suitably multiplied in the modulator and frequency synthesizer 30. The output of the modulator and frequency synthesizer 30 is fed to the transmitter 32 where it is suitably multiplied to the desired frequency in the kmc. range. The transmitted signal from the transmitter 32 is radiated to the space vehicle 11 being tracked. The space vehicle 11 contains a coherent transponder 33 which transmits a signal coherent with that received to a receiver 34 in the master station 10 and a receiver 35 in the slave station 12. The received frequency from the receiver 34 in the master station 10 is fed to a Doppler extraction circuit 36 which also receives the frequency reference from the master clock 15. The Doppler extraction circuit 36 compares the transmitted frequency reference with the received frequency, the difference being a measure of the range rate for the round trip from the master station to the vehicle and back to the master station, expressed mathematically as $2\dot{R}_m$. The receiver 34 also detects the received coded time signal which is fed to a comparator 37 which also receives the coded time reference signal generated by the master clock 15. The output of the comparator 37 in comparing the time of the transmitted signal with the time of the received transmitted signal generates a time difference output representing the total round trip range from the master station to the vehicle and back, expressed mathematically as $2R_m$. Since the slave clock 24, located in the slave station 12, has been corrected in time and frequency with the master clock 15 in the master station, as explained in connection with FIG. 2, it is only required for the slave station 12 to perform the same functions previously described for the master station 10 to determine range sum and the range rate sum. The received frequency output from the receiver 35 is fed to a Doppler extraction circuit 40 which also receives the frequency reference signal from the slave clock 24. The output of the Doppler extraction circuit 40 represents the Doppler frequency difference between the transmitted signal from the master station 10 and the received signal at the slave station 12, which is a measure of the sum of the range rate from the master station 10 to the space vehicle 11 ($\dot{R}_m$) and the range rate from the space vehicle to the slave station 12 ($\dot{R}_s$), expressed mathematically as $\dot{R}_m + \dot{R}_s$. The coded time signal output from the receiver 35 is fed to a comparator 41 which also receives the coded time reference signal from the slave clock 24. The output of the comparator 41 is therefore the time difference between the transmitted signal from the master station 10 and that received at the slave station which is a measure of the sum of the range from the master station 10 to the vehicle 11 ($R_m$) and the range from the space vehicle to the slave station 12 ($R_s$), expressed mathematically as $R_m + R_s$.

This disclosed timing configuration permits tracking stations to be grouped into precision interferometer networks with extremely long baselines, and hence provides the operational flexibility of trilateration networks. The accuracies which would be achievable in the measurement of range, range differences, range rate, and range rate differences utilizing conventional CW circuit techniques, coupled with the increased accuracies in station locations which could be achieved by using the tracking system for geodetic purposes, promise a very substantial improvement in metric accuracies relative to current capabilities.

Since the system described is basically a very long-baseline interferometer, it is very well suited to use with a single-channel CW transponder. Such a transponder would have much higher sensitivity and considerably reduced size, weight, and power requirements relative to a coherent pulse transponder suitable for use with the pulse Doppler radars. In addition, the CW tracking system would permit incorporation of telemetry and command features, to provide a fully integrated system.

The system baselines would be measured in hundreds, or even thousands, of nautical miles. With baselines of this length, the calibration problem is reduced to manageable proportions. Thus, it would only be necessary at each of the tracking stations to calibrate range to a foot or so and range rate to the order of 0.1 ft./sec.; calibration would be effected on a station-by-station basis with simple simulators. The calibration procedure should be compared with that for a conventional interferometer with a 100,000 foot baseline, in which the entire system must be calibrated as a unit; for such an interferometer, range differences must be calibrated to a few tenths of a foot and range rate differences to a few thousandths of a foot per second, in the presence of severe multipath problems caused by the necessity of having each of the interferometer antennas receive from a common transponder whose height above the earth is severely limited by practical considerations.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

The embodiments of the invention in which an exclusive property or privilege is claimed are defined as follows:

1. In combination,
   a plurality of stations remote from each other and having separate local clock means adapted to be synchronized with each other,
   a satellite having at least two transponders for two-way communications between at least two of said stations remote from each other but within line of sight to said satellite,
   means at a first station for transmitting a coded time reference signal to one of said satellite transponders for retransmission to said second station,
   means at said second station for retransmitting said coded time reference signal to the other of said satellite transponders for retransmission to said first station, and
   means at said first station for measuring the total transit time by comparing the time of transmission of the coded reference signal with the time of arrival of said coded reference signal,
   means at said first station for advancing the time of said coded time reference signal an amount equal to one half the total transit time,
   means at said second station for generating an error signal by comparing the time of said local clock means with the time received on said advanced reference signal, and
   means for controlling the time of said local clock means with said error signal.

2. In combination,
   a plurality of stations including a master station and slave stations remote from each other and having separate local clock means adapted to be synchronized with each other,
   a satellite having at least two transponders for two-way communications between at least two of said stations remote from each other but within line of sight to said satellite,
   means at a master station for transmitting a coded time reference signal to one of said satellite transponders for retransmission to a slave station,
   said master station and said slave stations comprising separate atomically stabilized oscillators as the basic time source,
   means at said slave station for retransmitting said coded time reference signal to the other of said satellite transponders for retransmission to said master station,
   means at said master station for measuring the total transit time by comparing the time of transmission of the coded reference signal with the time of arrival of said coded reference signal,
   means at said master station for advancing the time of said coded time reference signal an amount equal to one half the total transit time,
   means at said slave station for generating an error signal by comparing the time of said local clock means with the time received on said advanced reference signal, and
   means for controlling the time of said local clock means with said error signal.

3. An interferometer tracking system comprising,
   a plurality of remote ground stations having baselines substantially greater than the horizon distance,
   means at a master station for transmitting a CW radar signal to a target vehicle,
   means in said target vehicle for transmitting a signal phase coherent with the received signal to said ground stations,
   means for time synchronizing said master station with said remote ground stations comprising a satellite having at least two transponders for two-way communications between at least two of said stations remote from each other but within line of sight to said satellite,
   means at said master station for transmitting a coded time reference signal to one of said satellite transponders for retransmission to a slave station,
   means at said slave station for retransmitting said coded time reference signal to the other of said satellite transponders for retransmission to said master station,
   means at said master station for measuring the total transit time by comparing the time of transmission of the coded reference signal with the time of arrival of said coded reference signal,
   means at each of said stations for measuring the frequency difference between the transmitted and received signals as a measure of range rate, and
   means at each of said ground stations for measuring the time difference between the transmitted time and the received time as a measure of range to the vehicle.

4. An interferometer tracking system comprising:
   a plurality of remote ground stations having baselines substantially greater than the horizon distance,
   means at a master station for transmitting a CW radar signal to a target vehicle,
   means in said target vehicle for transmitting a signal phase coherent with the received signal to said ground stations,
   means for time synchronizing said master station with said remote ground stations comprising a satellite having at least two transponders for two-way communications between at least two of said stations remote from each other but within line of sight to said satellite,
   means at said master station for transmitting a coded time reference signal to one of said satellite transponders for retransmission to a slave station,
   means at said slave station for retransmitting said coded time reference signal to the other of said satellite transponders for retransmission to said master station,
   means at said master station for measuring the total transit time by comparing the time of transmission of the coded reference signal with the time of arrival of said coded reference signal,
   means at said master station for advancing the time of said coded time reference signal an amount equal to one half the total transit time,
   means at said slave station including a local clock means for generating an error signal by comparing the time of said local clock means with the time received on said advanced reference signal,
   means for controlling the time of said local clock means with said error signal, and
   means at each of said ground stations for measuring the time difference between the transmitted time and the received time as a measure of range to the vehicle.

5. A system according to claim 4 in which atomically stabilized oscillators are used as the basic time source at all of said ground stations.

6. A method of time synchronizing a pair of remotely located stations with each other by first transmitting a time coded signal from a first station to a second station, then transmitting said time coded signal from said second station back to said first station, then at said first station measuring the time difference between the transmitted and received time coded signal as a measure of the total transit time, then transmitting a time coded signal to said second station that is advanced in time an amount equal to one half the total transit time, then at said second station comparing the advanced time coded signal with a local time signal generated at said second station, and then controlling the locally generated time at said second station with the time difference signal to thereby synchronize said locally generated time at said second station with the time at said first station.

References Cited

UNITED STATES PATENTS 3,150,370  9/1964  Lisicky _____ 343—7.5 X
3,222,672  12/1965  Forestier _____ 343—7.5

RODNEY D. BENNETT, *Primary Examiner.*

CHESTER L. JUSTUS, *Examiner.*

T. H. TUBBESING, *Assistant Examiner.*